United States Patent
Roessel et al.

(10) Patent No.: US 9,848,425 B2
(45) Date of Patent: Dec. 19, 2017

(54) COMMUNICATION DEVICE AND METHOD FOR CONTROLLING TRANSCEIVER CHAINS OF A COMMUNICATION DEVICE

(71) Applicant: Intel Corporation, Santa Clara, CA (US)

(72) Inventors: Sabine Roessel, Munich (DE); Thorsten Tracht, Munich (DE); Andre Hanke, Unterhaching (DE); Elmar Wagner, Taufkirchen (DE); Andreas Menkhoff, Oberhaching (DE)

(73) Assignee: INTEL CORPORATION, Santa Clara, CA (US)

( * ) Notice: Subject to any disclaimer, the term of this patent is extended or adjusted under 35 U.S.C. 154(b) by 140 days.

(21) Appl. No.: 14/525,246

(22) Filed: Oct. 28, 2014

(65) Prior Publication Data

US 2016/0119925 A1 Apr. 28, 2016

(51) Int. Cl.
*H04W 72/04* (2009.01)
*H04B 1/40* (2015.01)
(Continued)

(52) U.S. Cl.
CPC .......... *H04W 72/0453* (2013.01); *H04B 1/40* (2013.01); *H04L 5/001* (2013.01);
(Continued)

(58) Field of Classification Search
CPC .......... H04B 1/40; H04B 1/44; H04B 1/0064; H04B 7/04; H04B 7/0689; H04B 7/0693;
(Continued)

(56) References Cited

U.S. PATENT DOCUMENTS

2006/0125689 A1* 6/2006 Narayan ................ G01S 19/21
   342/381
2008/0261573 A1 10/2008 Kuo
(Continued)

FOREIGN PATENT DOCUMENTS

| CN | 103004254 A | 3/2013 |
|----|---|---|
| EP | 2574094 A1 | 3/2013 |
| TW | I414200 B | 11/2013 |

OTHER PUBLICATIONS

European Search Report for the corresponding European Patent Application 15 18 4568, dated Feb. 23, 2016, 11 pages of Search Report.

(Continued)

*Primary Examiner* — John Pezzlo
*Assistant Examiner* — Dharmesh Patel
(74) *Attorney, Agent, or Firm* — Viering, Jentschura & Partner mbB

(57) ABSTRACT

A communication device is described comprising a first transceiver chain set to communicate signals in a first frequency range, a second transceiver chain set to communicate signals in a second frequency range or set to no communication and a controller, configured to receive an instruction for a resetting of carrier aggregation comprising a setting of the first transceiver chain or the second transceiver chain to receive signals in a third frequency range different from the first frequency range and the second frequency range, to control, in response of the reception of the instruction, the second transceiver chain to receive signals within the first frequency range simultaneously with the first transceiver chain and to control the first transceiver chain, when the communication of signals within the first frequency range by the second transceiver chain fulfills a predetermined criterion, to stop communication of signals within the first frequency range.

18 Claims, 7 Drawing Sheets

(51) Int. Cl.
*H04L 5/00* (2006.01)
*H04L 5/14* (2006.01)

(52) U.S. Cl.
CPC .......... *H04L 5/0085* (2013.01); *H04L 5/0098* (2013.01); *H04L 5/1469* (2013.01)

(58) Field of Classification Search
CPC ..... H04B 7/0871; H04B 7/0877; H04L 5/001; H04L 5/14; H04L 5/0098; H04W 76/06; H04W 76/025; H04W 76/064; H04W 88/06; H04W 92/18
See application file for complete search history.

(56) References Cited

U.S. PATENT DOCUMENTS

| | | | | |
|---|---|---|---|---|
| 2010/0074311 | A1* | 3/2010 | Kopmeiners | H04B 1/0028 375/220 |
| 2011/0222444 | A1* | 9/2011 | Khlat | H03F 3/189 370/277 |
| 2011/0243261 | A1 | 10/2011 | Bienas et al. | |
| 2013/0107742 | A1 | 5/2013 | Ishii | |
| 2013/0244722 | A1 | 9/2013 | Rousu et al. | |
| 2013/0329586 | A1* | 12/2013 | Mucke | H04W 24/02 370/252 |
| 2015/0016282 | A1* | 1/2015 | Su | H04W 36/0088 370/252 |

OTHER PUBLICATIONS

Renesas Mobile Europe LTD: "Analysis of interruptions in single RF IC inter-band carrier aggregation." Meeting: R4-67, May 2013, Fukuoka, Japan; 3GPP Draft R4-132705, 3rd Generation Partnership Project (3GPP), Mobile Competence Centre; Sophia-Antipolis Cedex, France.

Taiwanese Office Action based on Application No. 104131135 (8 Pages) dated Nov. 29, 2016 (Reference Purpose Only).

European Office Action based on Application No. 15 184 568.2 (5 Pages) dated Dec. 15, 2016 (Reference Purpose Only).

* cited by examiner

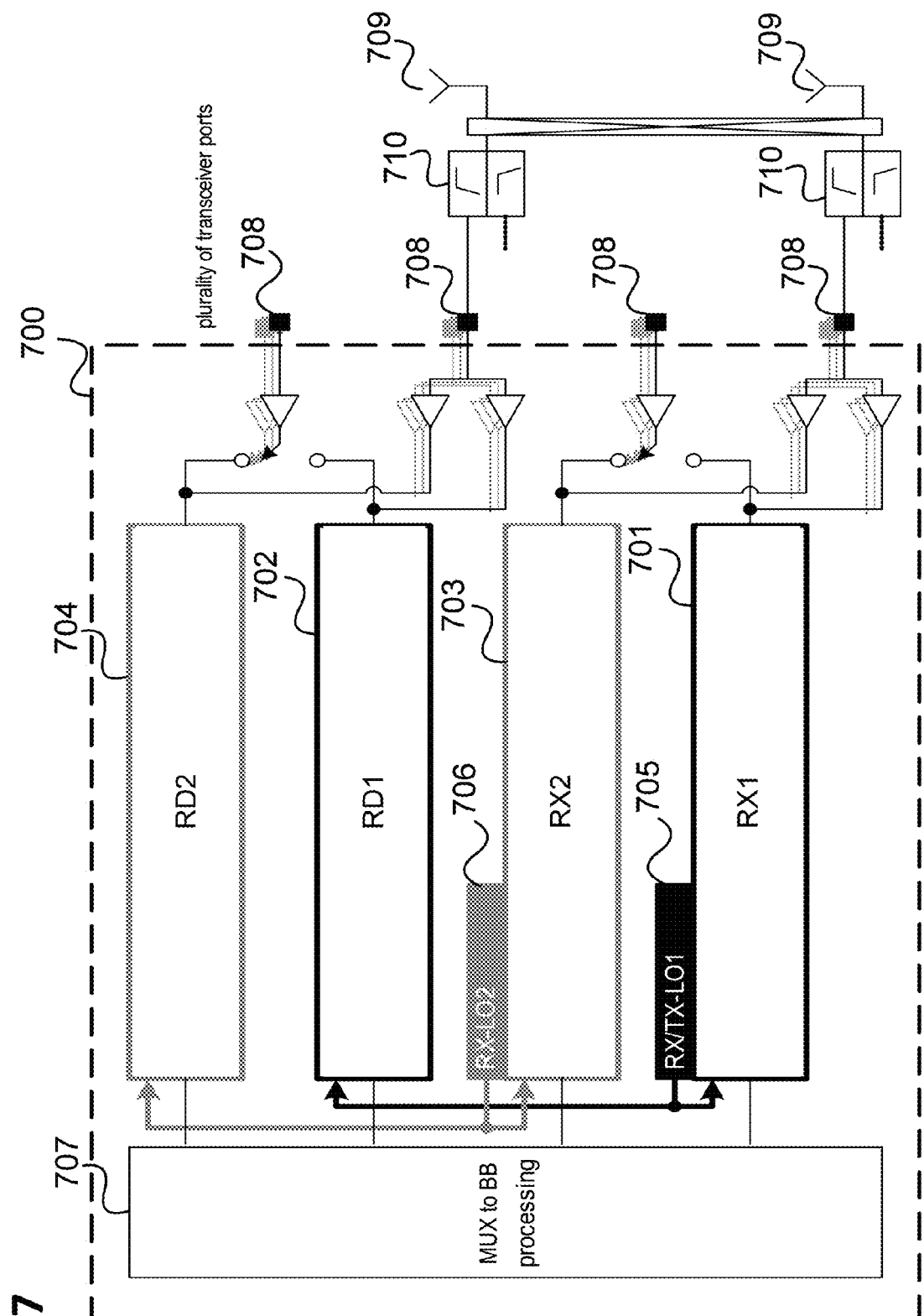

COMMUNICATION DEVICE AND METHOD FOR CONTROLLING TRANSCEIVER CHAINS OF A COMMUNICATION DEVICE

TECHNICAL FIELD

Embodiments described herein generally relate to communication devices and methods for controlling transceiver chains of a communication device.

BACKGROUND

When using carrier aggregation with a communication terminal with a plurality of receive chains for receiving component carriers in different bands, a communication terminal may need to change the allocation of one or more component carriers to receive chains. In such a scenario, it may be desirable to avoid the interruption of the reception of a component carrier when a receive chain is set to the reception of a different or additional component carrier.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 7 shows a transceiver with a plurality of receive branches per receive chain.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
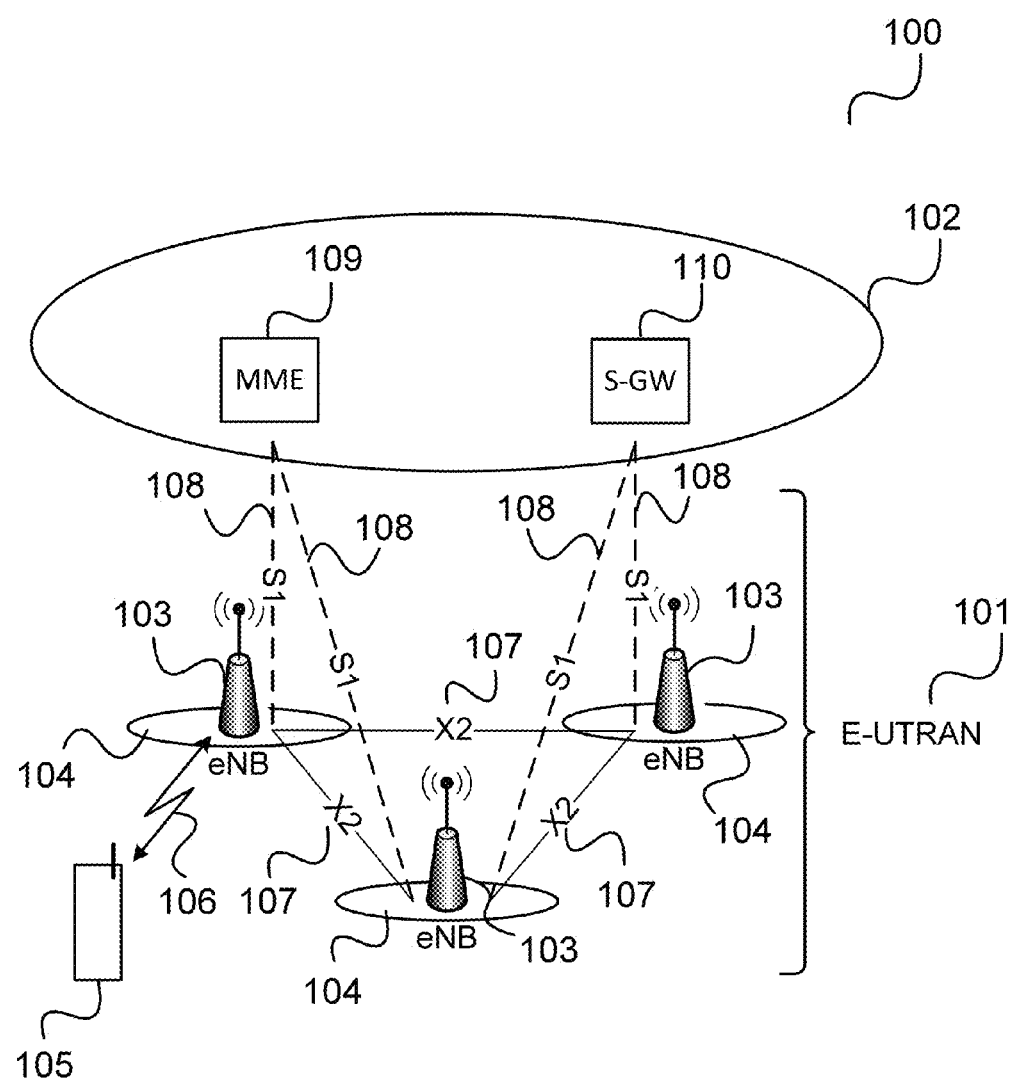
FIG. 1 shows a communication system.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol).

Mobile communication standard such as LTE-Advanced further evolves LTE in terms of spectral efficiency, cell edge throughput, coverage and latency based on the agreed requirements. One of the key characteristics of LTE-Advanced is the support of bandwidths >20 MHz and up to 100 MHz by spectrum or carrier aggregation, i.e. the bandwidth of an LTE-Advanced (LTE-A) radio cell is composed of a number of so-called component carriers (CC), in where the bandwidth size of each component carrier is limited to a maximum of 20 MHz. Component carriers may be provided by different cells (serving cells) wherein a primary serving cell handles the RRC (radio resource control) connection and provides the primary component carrier. The one or more other serving cells offering component carriers are referred to as secondary cells.

The component carriers may be adjacent or non-adjacent. In a mobile communication standard, such as LTE-A, UE may simultaneously receive or transmit on one or multiple component carriers depending on its RF capabilities. The carriers (i.e. the component carriers) can lie within different frequency bands (inter-band) or within the same frequency band next to each other (intra-band contiguous) or in the same frequency band but with a frequency gap between them (intra-band non-contiguous). With a primary carrier active adding a secondary carrier may cause primary cell interruptions for a certain period of time:

Due to the need of changing the Local Oscillator (LO) that the primary Cell must be assigned to in case of multiple integrated LOs, i.e. primary cell interruption in Inter-band LTE DL CA (Downlink Carrier Aggregation) of two or more carriers where the frequency band combinations would support activation of the secondary carrier without primary cell interruption and that require switchover of the LO.

In contiguous Intra-band LTE DL CA of two carriers due to the need of reconfiguring a single carrier with a contiguous dual carrier (e.g. from 20 MHz to contiguous 40 MHz).

Further, an interruption of primary cell communication may be caused in the following scenarios (in all cases (inter/intra contiguous/non-contiguous)): 1) Primary Cell (PCell) interruption in Inter-band LTE DL carrier aggregation of two or more carriers.

A mobile terminal may have two or more RF (radio frequency) receive chains as well as corresponding local oscillators and/or frequency synthesizers integrated in a single highly integrated chip. Such an integration may, however, pose constraints on the assignment of channels to the receive chains: depending on the configured CA (carrier aggregation) capability, configuring and activating a new secondary cell may imply that the primary cell—although not being changed—needs to be switched from one receive chain to another. If such a switch-over is necessary, the operation on the primary cell (PCell) will typically be interrupted. Such an interruption may for example affect two air interface subframes (wherein one subframe has a duration of 1 ms). For inter-band carrier aggregation, interrupting the primary cell is typically not acceptable—if it is not anyways required due to the combination of the frequency bands (e.g. high-high band combination).

The interruption of the primary cell may be avoided by keeping the primary cell receive chain isolated (i.e. no integration) which however implies that a significantly lower number of RF carriers can be supported (per chip area) and there is lower flexibility and less roaming potential.

2) Primary cell interruption in Intra-band Contiguous LTE DL carrier aggregation.

When switching from a smaller (e.g. 20 MHz bandwidth) to a wider (e.g. 40 MHz) bandwidth (e.g. by activating an intra-band contiguous secondary cell) a single receive chain implementation implies that operation on the primary cell (PCell) is interrupted. Such an interruption may for example affect two air interface subframes (wherein 1 subframe has a duration of 1 ms).

This may be avoided by dedicating two receive chains to contiguous intraband spectrum. However, this reduces the support of further non-contiguous or inter-band secondary cells and leads to an extra current consumption for the two receive chains compared to one (where, for example, only one phase locked loop (PLL) and only one analog receive chain is needed).

In the following, an approach is described which may for example be used to avoid primary cell (PCell) interruption in Inter-band LTE DL carrier aggregation of two or more carriers as well as in Intra-band Contiguous LTE DL carrier aggregation. Further, the approach may be used to avoid interruptions in LTE uplink carrier aggregation.

Figure 2:
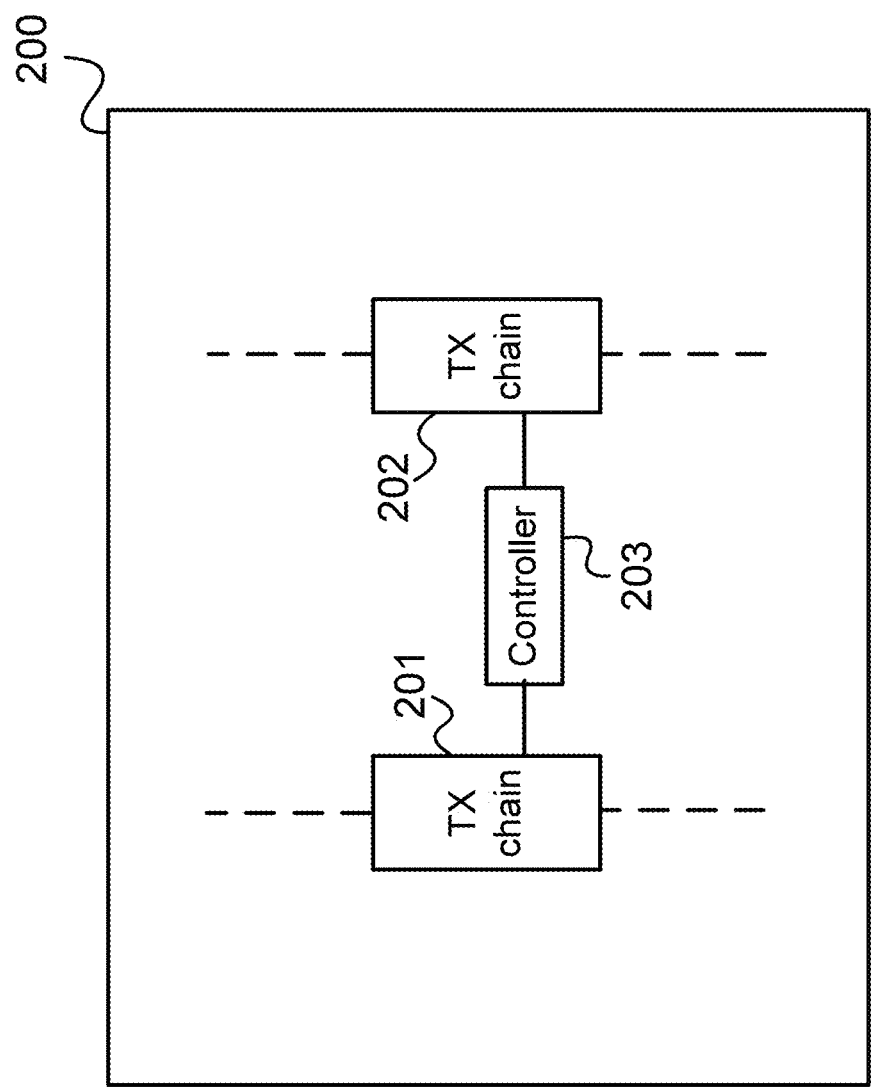
FIG. 2 shows a communication device.

FIG. 2 shows a communication device 200.

The communication device 200 includes a first transceiver chain 201 set to communicate (i.e. to receive and/or transmit) signals in a first frequency range and a second receive chain 202 set to communicate signals in a second frequency range or set to no communication. For example, a component of the communication device 200 has set the first transceiver chain 201 and the second transceiver chain 202 to the first frequency range and the second frequency range, respectively, e.g. for performing a data transmission.

The communication device 200 further includes a controller 203 configured to receive an instruction for a resetting of carrier aggregation comprising (e.g. requiring) a setting of the first transceiver chain 201 or the second transceiver chain 202 to communicate signals in a third frequency range different from the first frequency range and the second frequency range, to control, in response of the reception of the instruction, the second transceiver chain 202 to communicate signals within the first frequency range simultaneously with the first transceiver chain 201 and to control the first transceiver chain 201, when the reception of signals within the first frequency range by the second receive chain fulfills a predetermined criterion, to stop communication of signals within the first frequency range.

In other words, there is an overlap of the communication of signals of a first frequency range (e.g. a first component carrier, e.g. provided by a primary cell) by two transceiver chains of a communication device (e.g. a communication terminal such as a mobile terminal, e.g. a subscriber terminal of a mobile communication network) when there is a reallocation of the transceiver chains to frequency ranges (e.g.

component carriers). This allows avoiding an interruption of the communication (i.e. transmission or reception) of data via the first frequency range.

The transceiver chains are for example receive chains or transmit chains. Accordingly, a transceiver chain being set to communicate signals for example means that the transceiver chain is being set to receive signals or to transmit signals, respectively. The instruction for a resetting can be understood as a change of the setting of carrier aggregation and can be seen to require a reallocation of frequency ranges to transceiver chains, i.e. a change of which frequency range (e.g. corresponding to one or more component carriers) is allocated to which transceiver chain. A frequency range corresponding to a component carrier may be understood as the frequency range being the frequency range of the component carrier, e.g. a frequency range of 20 MHz in case of a 20 MHz component carrier. A transceiver chain being set to communicate signals in a certain frequency range may be understood that the transceiver chains has a plurality of possible settings, i.e. a plurality of frequency ranges in which it can communicate, and a component of the communication device has selected one of these settings and has controlled or controls the transceiver chain accordingly, e.g. has switched the transceiver chain to this setting (e.g. from a default setting).

In other words, for example, for the receiving case, the controller temporarily generates a "shadow primary cell" in the RF (radio frequency) receiver (which for example contains two or more integrated receive chains) and allows a baseband circuit to do a "soft switchover" of the primary cell from one receive chain to the other.

Figure 5:
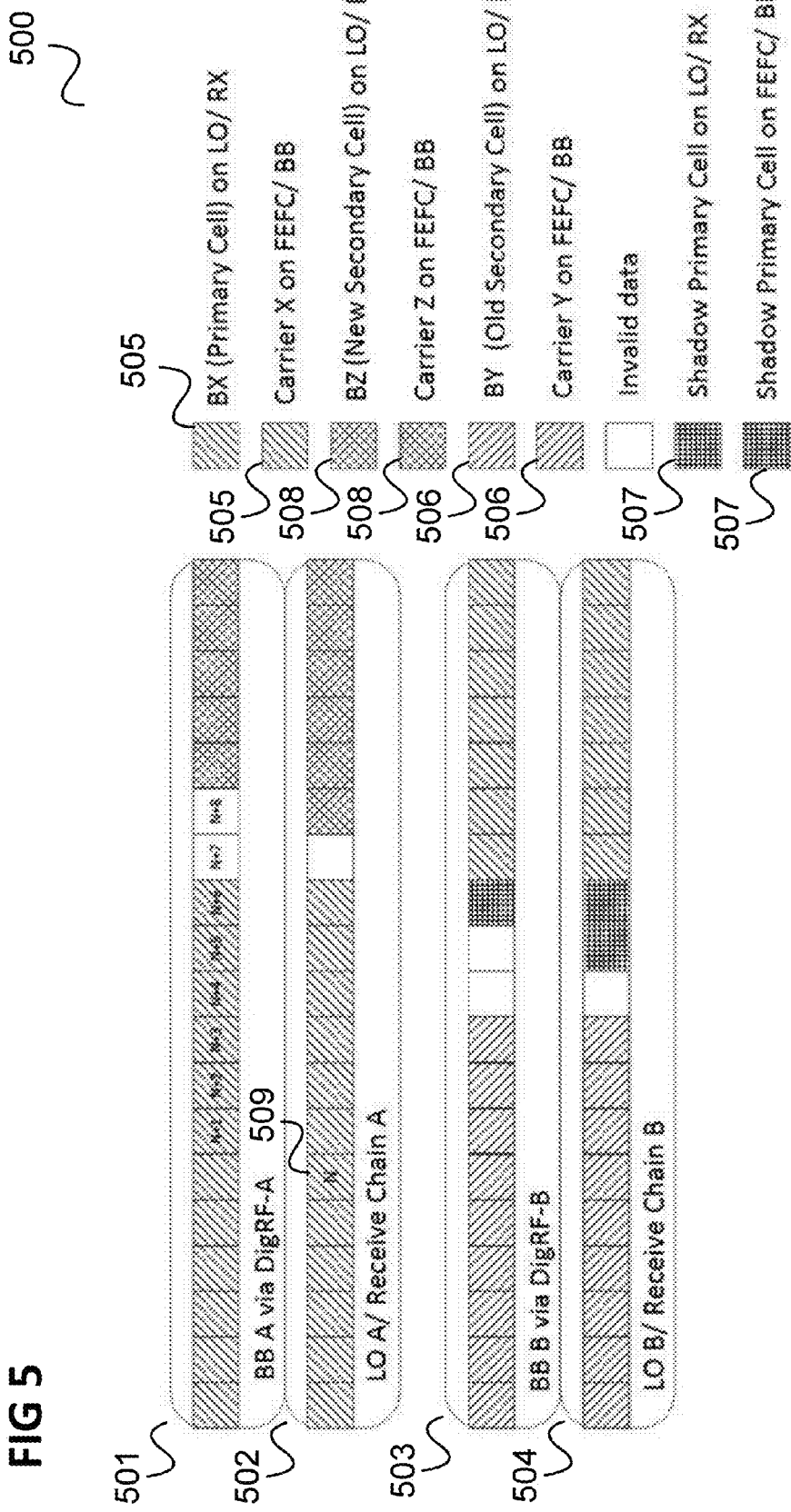
FIG. 5 shows an allocation diagram illustrating an allocation of carriers to receive chains in a scenario where an inter-band secondary cell is activated.
Figure 6:
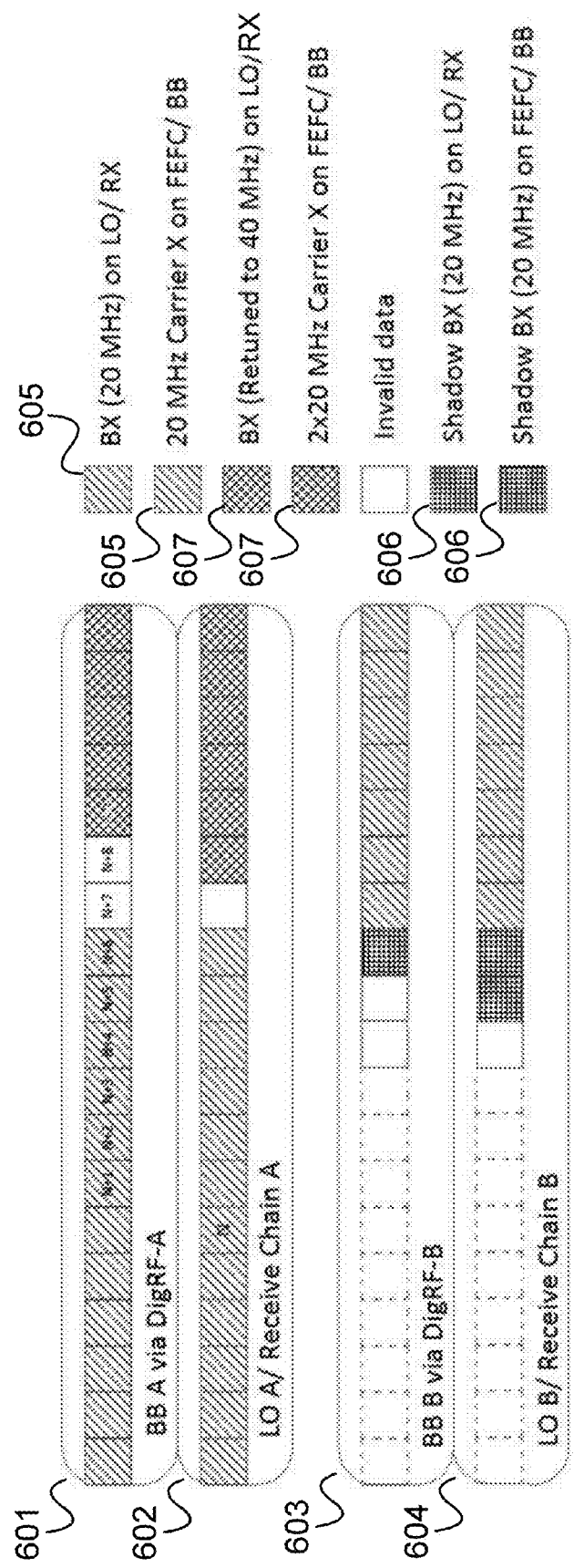
FIG. 6 shows an allocation diagram illustrating an allocation of carriers to receive chains in a scenario where an intra-band contiguous secondary cell is activated.

This allows, in both scenarios 1) and 2) described above, to avoid an interruption of the primary cell's data flow. Thus, a loss of data (e.g. content) can be avoided. An interruption of the primary cell communication can be avoided despite the RF (radio frequency) switching and BB (baseband) adaptation times, and as requested by the 3GPP standard, it can be ensured that in the 9th TTI after the reception of a corresponding MAC CE (control element, e.g. a new secondary cell MAC CE) the communication terminal receives, e.g. a new secondary cell (for inter-band, as illustrated in FIG. 5 below) or a carrier with extended bandwidth (for contiguous intraband as illustrated in FIG. 6 below). Further, LTE gap-less measurements may be supported.

Figure 3:
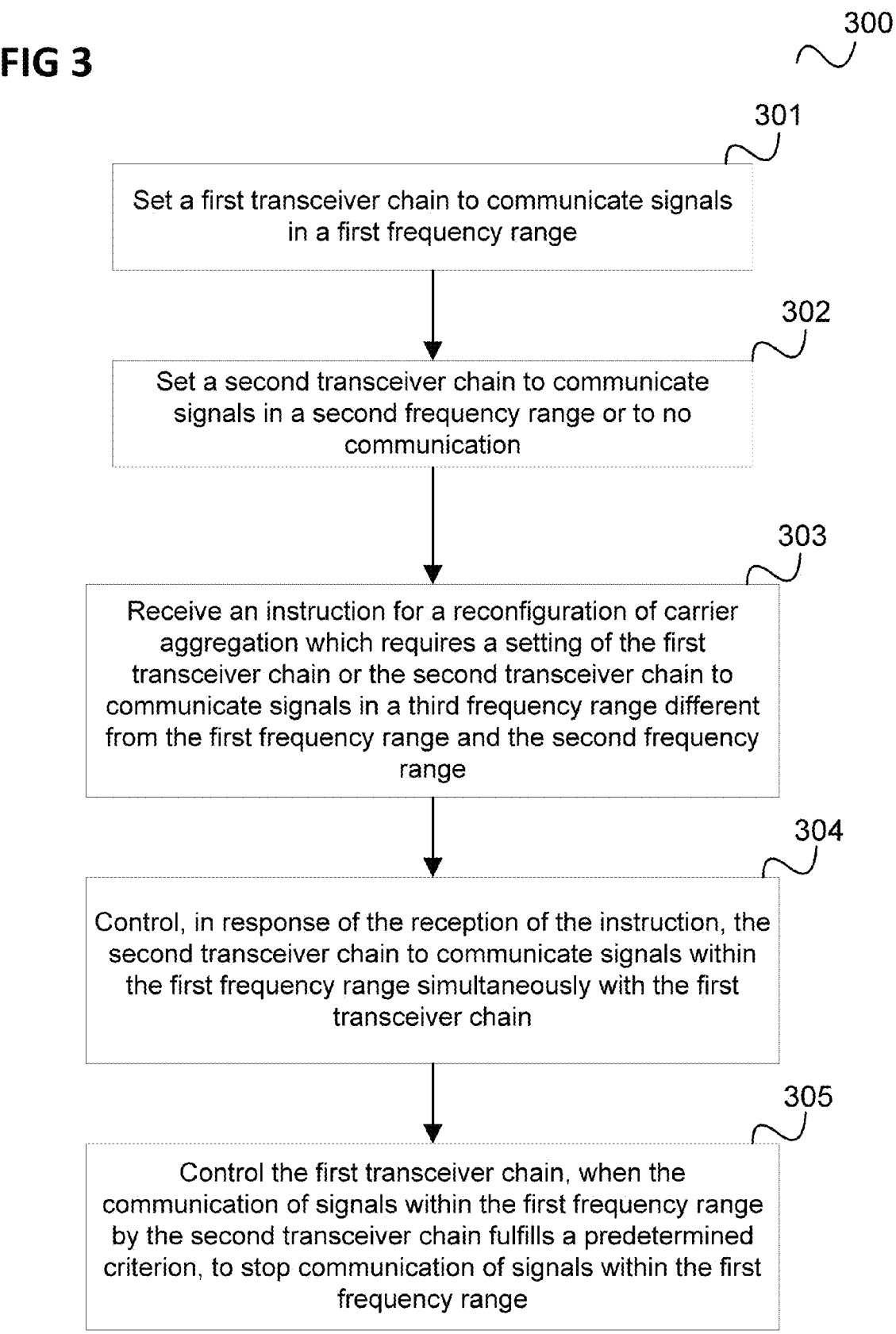
FIG. 3 shows a flow diagram illustrating a method for controlling receive chains of a communication device, for example carried out by a controller of the communication device.

The communication device 200 for example carries out a method as illustrated in FIG. 3.

FIG. 3 shows a flow diagram 300 illustrating a method for controlling transceiver chains of a communication device, for example carried out by a controller of the communication device.

In 301, the controller sets a first transceiver chain to communicate (i.e. receive and/or transmit) signals in a first frequency range.

In 302, the controller sets a second transceiver chain to communicate signals in a second frequency range or to no communication.

In 303, the controller receives an instruction for a resetting of carrier aggregation comprising a setting of the first transceiver chain or the second transceiver chain to communicate signals in a third frequency range different from the first frequency range and the second frequency range.

In 304, the controller controls, in response of the reception of the instruction, the second transceiver chain to communicate signals within the first frequency range simultaneously with the first transceiver chain.

In 305, the controller controls the first transceiver chain, when the communication of signals within the first frequency range by the second receive chain fulfills a predetermined criterion, to stop communication of signals within the first frequency range.

The following examples pertain to further embodiments.

Example 1 is a communication device as illustrated in FIG. 2.

In Example 2, the subject matter of Examples 1 may optionally include the resetting requiring a setting of the first transceiver chain to communicate signals within the third frequency range and the controller being configured to control the first transceiver chain, when the communication of signals within the first frequency range by the second transceiver chain fulfills a predetermined criterion, to communicate signals within the third frequency range.

In Example 3, the subject matter of Example 2 may optionally include the resetting of carrier aggregation being a resetting to a setting in which the second transceiver chain is prevented from communicating signals in the third frequency range.

In Example 4, the subject matter of any one of Examples 2-3 may optionally include the controller being configured to control the first transceiver chain to stop communication of signals within the first frequency range for a retuning of the first transceiver chain to the third frequency range.

In Example 5, the subject matter of any one of Examples 1-4 may optionally include the third frequency range comprising the first frequency range.

In Example 6, the subject matter of any one of Examples 1-5 may optionally include the first frequency range corresponding to a component carrier and the third frequency range corresponding to a plurality of component carriers including the component carrier.

In Example 7, the subject matter of any one of Examples 1-6 may optionally include the third frequency range comprising the first frequency range and the resetting requiring a setting of the second transceiver chain to communicate signals within the third frequency range and the controller being configured to control the first transceiver chain, when the communication of signals within the first frequency range by the second transceiver chain fulfills a predetermined criterion, to stop communication of signals within the first frequency range.

In Example 8, the subject matter of any one of Examples 1-7 may optionally include the first frequency range, the second frequency range and the third frequency range each corresponding to one or more component carriers.

In Example 9, the subject matter of any one of Examples 1-8 may optionally include the instruction for a resetting of carrier aggregation being an instruction for an activation of a communication of the third frequency range.

In Example 10, the subject matter of any one of Examples 1-9 may optionally include the instruction being a Medium Access Control Control Element.

In Example 11, the subject matter of any one of Examples 1-10 may optionally include the predetermined criterion being that the second transceiver chain provides valid I/Q data from the reception of signals within the first frequency range.

In Example 12, the subject matter of any one of Examples 1-11 may optionally include the predetermined criterion being that the second transceiver chain provides data whose error rate being below a predetermined threshold from the reception of signals within the first frequency range.

In Example 13, the subject matter of any one of Examples 1-12 may optionally include a baseband circuit wherein each transceiver chain is configured to at least one of provide data to the baseband circuit from the communication of signals in a frequency range and to receive data from the baseband circuit for the communication of signals in the frequency range.

In Example 14, the subject matter of any one of Examples 1-13 may optionally include the first frequency range being a frequency range of a primary radio cell of the communication device and the second frequency range being a frequency range of a secondary radio cell of the communication device.

In Example 15, the subject matter of any one of Examples 1-14 may optionally include the first transceiver chain and the second transceiver chain being integrated into a single chip.

In Example 16, the subject matter of any one of Examples 1-15 may optionally include the third frequency range being a frequency range for performing radio measurements.

Example 17 is a method for controlling transceiver chains of a communication device as illustrated in FIG. 3.

In Example 18, the subject matter of Example 17 may optionally include the resetting requiring a setting of the first transceiver chain to communicate signals within the third frequency range and the method further comprising controlling the first transceiver chain, when the communication of signals within the first frequency range by the second transceiver chain fulfills a predetermined criterion, to communicate signals within the third frequency range.

In Example 19, the subject matter of Example 18 may optionally include the resetting of carrier aggregation being a resetting to a setting in which the second transceiver chain is prevented from communicating signals in the third frequency range.

In Example 20, the subject matter of any one of Examples 18-19 may optionally include controlling the first transceiver chain to stop communication of signals within the first frequency range for a retuning of the first transceiver chain to the third frequency range.

In Example 21, the subject matter of any one of Examples 17-20 may optionally include the third frequency range comprising the first frequency range.

In Example 22, the subject matter of any one of Examples 17-21 may optionally include the first frequency range corresponding to a component carrier and the third frequency range corresponding to a plurality of component carriers including the component carrier.

In Example 23, the subject matter of any one of Examples 17-22 may optionally include the third frequency range comprising the first frequency range and the resetting requiring a setting of the second transceiver chain to communicate signals within the third frequency range and the method comprising controlling the first transceiver chain, when the communication of signals within the first frequency range by the second transceiver chain fulfills a predetermined criterion, to stop communication of signals within the first frequency range.

In Example 24, the subject matter of any one of Examples 17-23 may optionally include the first frequency range, the second frequency range and the third frequency range each corresponding to one or more component carriers.

In Example 25, the subject matter of any one of Examples 17-24 may optionally include the instruction for a resetting of carrier aggregation being an instruction for an activation of a communication of the third frequency range.

In Example 26, the subject matter of any one of Examples 17-25 may optionally include the instruction being a Medium Access Control Control Element.

In Example 27, the subject matter of any one of Examples 17-26 may optionally include the predetermined criterion being that the second transceiver chain provides valid I/Q data from the reception of signals within the first frequency range.

In Example 28, the subject matter of any one of Examples 17-27 may optionally include the predetermined criterion being that the second transceiver chain provides data whose error rate being below a predetermined threshold from the reception of signals within the first frequency range.

In Example 29, the subject matter of any one of Examples 17-28 may optionally include each transceiver chain at least one of providing data to a baseband circuit from the communication of signals in a frequency range and receiving data from the baseband circuit for the communication of signals in the frequency range.

In Example 30, the subject matter of any one of Examples 17-29 may optionally include the first frequency range being a frequency range of a primary radio cell of the communication device and the second frequency range being a frequency range of a secondary radio cell of the communication device.

In Example 31, the subject matter of any one of Examples 17-30 may optionally include the first transceiver chain and the second transceiver chain being integrated into a single chip.

In Example 32 the subject matter of any one of Examples 17-31 may optionally include the third frequency range being a frequency range for performing radio measurements.

Example 33 is a computer readable medium having recorded instructions thereon which, when executed by a processor, make the processor perform a method for performing radio communication according to any one of Examples 17 to 32.

Example 34 is a communication device comprising a first transceiver chain set to communicate signals in a first frequency range; a second transceiver chain set to communicate signals in a second frequency range or set to no communication; and a controlling means for receiving an instruction for a resetting of carrier aggregation comprising a setting of the first transceiver chain or the second transceiver chain to communicate signals in a third frequency range different from the first frequency range and the second frequency range; controlling, in response of the reception of the instruction, the second transceiver chain to communicate signals within the first frequency range simultaneously with the first transceiver chain; and controlling the first transceiver chain, when the communication of signals within the first frequency range by the second transceiver chain fulfills a predetermined criterion, to stop communication of signals within the first frequency range.

In Example 35, the subject matter of Example 34 may optionally include the resetting requiring a setting of the first transceiver chain to communicate signals within the third frequency range and the controlling means being for controlling the first transceiver chain, when the communication of signals within the first frequency range by the second transceiver chain fulfills a predetermined criterion, to communicate signals within the third frequency range.

In Example 36, the subject matter of Example 35 may optionally include the resetting of carrier aggregation being a resetting to a setting in which the second transceiver chain is prevented from communicating signals in the third frequency range.

In Example 37, the subject matter of any one of Examples 35-36 may optionally include the controlling means being for controlling the first transceiver chain to stop communication of signals within the first frequency range for a retuning of the first transceiver chain to the third frequency range.

In Example 38, the subject matter of any one of Examples 34-37 may optionally include the third frequency range comprising the first frequency range.

In Example 39, the subject matter of any one of Examples 34-38 may optionally include the first frequency range corresponding to a component carrier and the third frequency range corresponding to a plurality of component carriers including the component carrier.

In Example 40, the subject matter of any one of Examples 34-39 may optionally include the third frequency range comprising the first frequency range and the resetting requiring a setting of the second transceiver chain to communicate signals within the third frequency range and the controlling means being for controlling the first transceiver chain, when the communication of signals within the first frequency range by the second transceiver chain fulfills a predetermined criterion, to stop communication of signals within the first frequency range.

In Example 41, the subject matter of any one of Examples 34-40 may optionally include the first frequency range, the second frequency range and the third frequency range each corresponding to one or more component carriers.

In Example 42, the subject matter of any one of Examples 34-41 may optionally include the instruction for a resetting of carrier aggregation being an instruction for an activation of a communication of the third frequency range.

In Example 43, the subject matter of any one of Examples 34-42 may optionally include the instruction being a Medium Access Control Control Element.

In Example 44, the subject matter of any one of Examples 34-43 may optionally include the predetermined criterion being that the second transceiver chain provides valid I/Q data from the reception of signals within the first frequency range.

In Example 45, the subject matter of any one of Examples 34-44 may optionally include the predetermined criterion being that the second transceiver chain provides data whose error rate being below a predetermined threshold from the reception of signals within the first frequency range.

In Example 46, the subject matter of any one of Examples 34-45 may optionally include a baseband circuit wherein each transceiver chain is for at least one of providing data to the baseband circuit from the communication of signals in a frequency range and for receiving data from the baseband circuit for the communication of signals in the frequency range.

In Example 47, the subject matter of any one of Examples 34-46 may optionally include the first frequency range being a frequency range of a primary radio cell of the communication device and the second frequency range being a frequency range of a secondary radio cell of the communication device.

In Example 48, the subject matter of any one of Examples 34-47 may optionally include the first transceiver chain and the second transceiver chain being integrated into a single chip.

In Example 49, the subject matter of any one of Examples 34-48 may optionally include the third frequency range being a frequency range for performing radio measurements.

It should be noted that one or more of the features of any of the examples above may be combined with any one of the other examples.

In the following, examples are described in more detail. The following examples are described with an exemplary architecture of a communication terminal, e.g. corresponding to mobile terminal 105, as illustrated in FIG. 4 and are described for the receiving (downlink) case but are analogously applicable for the transmitting (uplink) case.

Figure 4:
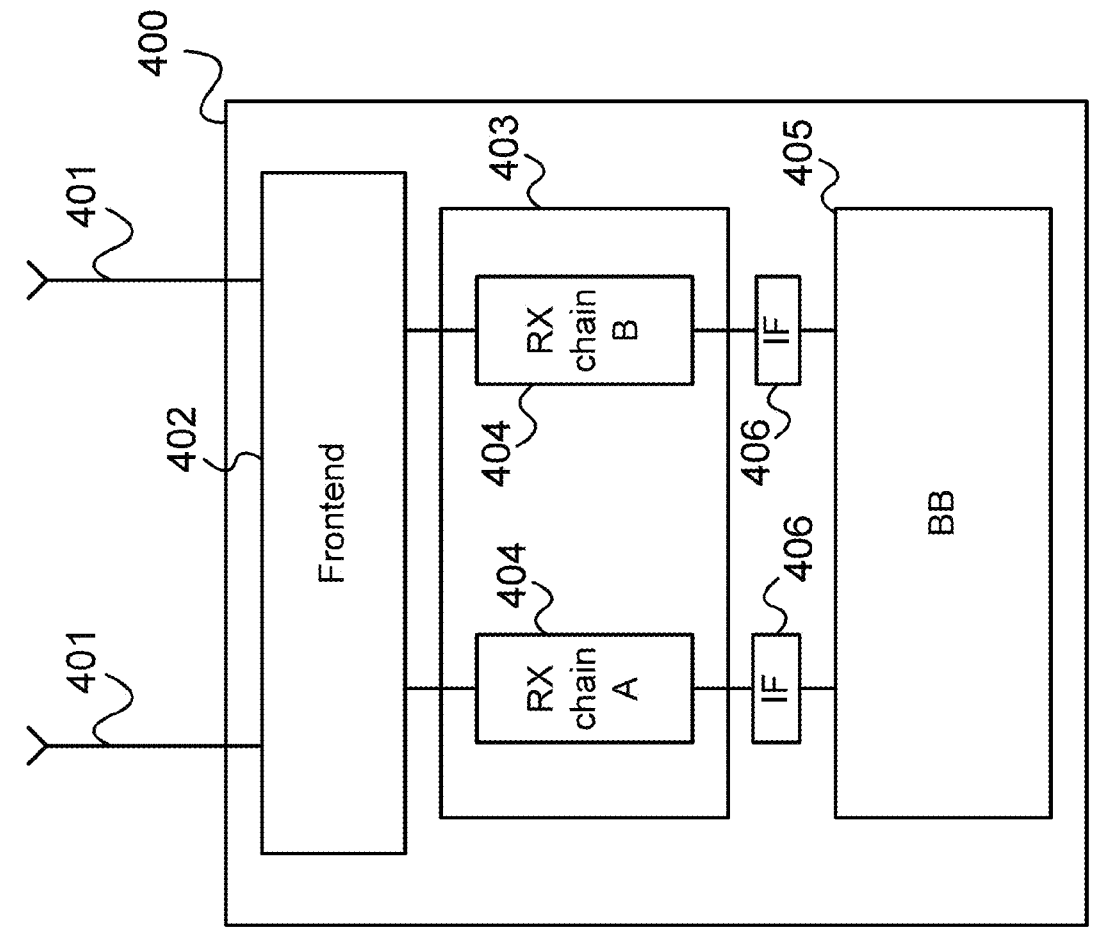
FIG. 4 shows a communication terminal.

FIG. 4 shows a communication terminal 400.

The communication terminal 400 includes one or more antenna 401 which are coupled to a RF frontend 402. The frontend 402 supplies signals received via the antennas 401 to a transceiver 403 which in this example includes two receive chains 404 which for example each include a local oscillator and a low noise amplifier. For transmitting, the transceiver 403 may include one or more transmit chains which are not shown in FIG. 4.

Each receive chain 404 is coupled to a baseband circuit 405 via an interface 406 (e.g. a DigRF interface).

The baseband circuit 405 may for example perform error correction (e.g. CRC checking) and OFDM demodulation of the received signals. It may also have the functionality of the controller 203. Alternatively, a component having the functionality of the controller 203 may be provided in addition.

In the following an example of an application of the approach described with reference to FIGS. 2 and 3 to the scenario 1) described above is given, i.e. an example in which primary cell interruption in Inter-band LTE DL carrier aggregation is avoided.

FIG. 5 shows an allocation diagram 500 illustrating an allocation of carriers to receive chains.

In the allocation diagram 500, time flows from left to right.

A first sub-diagram 501 indicates the carrier of which the baseband circuit 405 receives data via the interface 406 to the first receive chain.

A second sub-diagram 502 indicates the carrier received by the first receive chain.

A third sub-diagram 503 indicates the carrier of which the baseband circuit 405 receives data via the interface 406 to the second receive chain.

A fourth sub-diagram 504 indicates the carrier received by the second receive chain.

It is assumed that at first, the communication terminal 400 operates a 10 MHz carrier on band X for a primary cell (indicated by a rising diagonal hatching 505) and another 10 MHz carrier on band Y (indicated by a falling diagonal hatching 506) for a secondary cell.

The primary cell was assigned to a first of the receive chains 404 (receive chain A), and the secondary cell was assigned to a second of the receive chains 404 (receive chain B).

It is further assumed that due to traffic load balancing the network decides to reconfigure the secondary cell to a 20 MHz carrier on band Z without change regarding the 10 MHz carrier on band X for the primary cell.

In an integrated solution it may be the case that band Z cannot be assigned to the second receive chain B although this would be necessary in order to keep the primary cell untouched. Assuming in this example that this is not possible, the primary cell on the first receive chain A needs to be interrupted to be re-assigned to the second receive chain B and to make room for band Z on the first receive chain A.

For this, a "soft switchover" of the primary cell from the first receive chain A to the second receive chain B is performed. The primary cell continues to be received on the first receive chain A, while at the same time the second receive chain B is ramped up to also receive the primary cell, i.e. the "shadow primary cell". During the ramping up, the second receive chain B provides invalid data.

It is assumed that ramping up the second receive chain B for the shadow PCell is possible within a certain time not exceeding 1 ms. The ramping up of the receive chain for example includes starting (or reconfiguring) the DigRF interface (if necessary) 406 of the receive chain, tuning the LO of the receive chain, and the activation of automatic gain control (AGC) for the shadow primary cell.

As soon as the reception of the primary cell via the second receive chain fulfills a predetermined criterion, e.g. as soon as the baseband circuit 405 is able to receive valid I/Q data (which may differ from the I/Q data provided by the first receive chain A, but is for example correct in the sense of OFDM sampling within the Cyclic Prefix) from the shadow primary cell, as indicated by the rising square hatching 507, it releases the primary cell on the first receive chain A, and the secondary cell is activated on the first receive chain A as indicated by cross hatching 508. The reception of the primary cell on the second receive chain B continues as indicated by the rising diagonal hatching 505 in the third sub-diagram 503 and the fourth sub-diagram 504.

It is assumed that the reception of valid I/Q data of the shadow primary cell via the second receive chain B is possible within a certain time and does not take longer than 1 ms. During the soft switchover phase (indicated by square hatching 507), the baseband circuit 405 has I/Q data coming in, and hence there is no primary cell interruption on the air interface.

The 3GPP specification requires that the communication terminal (UE) is able to receive an uplink (UL) grant for a secondary cell no later than in the 9th TTI after submission of the MAC Control Element (CE) activating the secondary cell.

Assuming that after the reception of the MAC CE at a TTI N 509 it takes the UE 3 ms (i.e. three TTIs) to process the MAC CE, there are 5 ms left to activate the secondary cell and hence 5 ms to do the primary cell Soft Switchover and the secondary cell ramp-up.

With the duration of the soft-switch over including ramping up the second receive chain B for the primary cell and ramping up the first receive chain A for the new secondary cell (carrier Z) as illustrated in FIG. 5, the new secondary cell can be received via the first receive chain A (i.e. is "on air") in the 9th TTI after the reception of the new secondary cell activation MAC CE in TTI N 509 while the loss of contents of the primary cell may be avoided despite the RF switching and BB adaptation times.

In the following an example of an application of the approach described with reference to FIGS. 2 and 3 to the scenario 2) described above is given, i.e. an example in which primary cell interruption in Intra-band Contiguous LTE DL carrier aggregation is avoided.

FIG. 6 shows an allocation diagram 600 illustrating an allocation of carriers to receive chains.

In the allocation diagram 600, time flows from left to right.

A first sub-diagram 601 indicates the carrier of which the baseband circuit 405 receives data via the interface 406 to the first receive chain.

A second sub-diagram 602 indicates the carrier received by the first receive chain.

A third sub-diagram 603 indicates the carrier of which the baseband circuit 405 receives data via the interface 406 to the second receive chain.

A fourth sub-diagram 604 indicates the carrier received by the second receive chain.

It should be noted that in this example "carrier" may also refer to a frequency range comprising more than one component carriers. Specifically, the primary cell is in this example reconfigured to a frequency range of 40 MHz (for example including two 20 MHz component carriers).

It is assumed that at first, the communication terminal 400 operates a 10 MHz carrier on band X for a primary cell (indicated by a rising diagonal hatching 605).

The primary cell was assigned to a first of the receive chain 404 (receive chain A).

It is further assumed that the network decides to reconfigure the primary cell to a 40 MHz frequency range on band X (for example including two 20 MHz component carriers).

Similarly to the example described with reference to FIG. 5, for this, the second receive chain B is ramped up with a shadow primary cell. Again, the baseband circuit 405 switches to the second receive chain B as soon as the shadow primary cell provides consistent I/Q data (indicated by square hatching 606). Assuming that the first receive chain A is the target receiver chain for the aggregated intra-band contiguous carriers (i.e. the 40 MHz frequency range in band X), the Soft Switchover continues by re-configuring the first receive chain A with the full aggregated bandwidth as indicated by the cross-hatching 607.

The reception of the original 20 MHz carrier in band X on the second receive chain B (rising diagonal hatching 605 in the third sub-diagram 603 and the fourth sub-diagram 604) may then be stopped.

The examples illustrated in FIG. 6 shows the option of seamless contiguous intra-band secondary cell activation where the source and destination receive chains are the first receive chain A. However, there is also the option that the second receive chain B is the target receive chain for the aggregated intraband contiguous component carriers. In this case, the secondary receive chain may be directly configured with the sum bandwidth of the original primary cell and the activated additional bandwidth from the intra-band contiguous secondary cell (instead of only the bandwidth of the original primary cell as illustrated in FIG. 6), and the soft switchover procedure stops by releasing the original primary cell on the first receive chain A.

It should be noted that for RX diversity, a receive chain 404 may have two (or even more) receive branches. The two receive branch case is illustrated in FIG. 7.

FIG. 7 shows a transceiver 700.

The transceiver 700 for example corresponds to the transceiver 403. It comprises a first receive branch 701, a first receive diversity branch 702, a second receive branch 703 and a second receive diversity branch 704. The first receive branch 701 and the first receive diversity branch 702 for example correspond to one of the receive chains 404 and are supplied with a frequency signal from a first local oscillator (LO) 705. The second receive branch 703 and the second receive diversity branch 704 for example correspond to the other of the receive chains 404 and are supplied with a frequency signal from a second local oscillator (LO) 706.

The transceiver 700 further comprises a multiplexer 707 which provides a connection of the receive branches 701, 702, 703, 704 to the baseband processor, e.g. to the baseband circuit 405.

The receive branches 701, 702, 703, 704 are connected to transceiver ports 708 which are connected to antennas 709 via frontend components 710.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising:
    a first transceiver chain set to communicate signals in a first frequency range;
    a second transceiver chain set to communicate signals in a second frequency range distinct from the first frequency range, or set to no communication; and
    a controller, configured
        to receive an instruction for a resetting of carrier aggregation comprising a setting of the first transceiver chain or the second transceiver chain to communicate signals in a third frequency range different from the first frequency range and the second frequency range;
        to control, in response to the reception of the instruction, the second transceiver chain to communicate signals within the first frequency range while the first transceiver chain simultaneously communicates signals within the first frequency range;
        to control the first transceiver chain, when the communication of signals within the first frequency range by the second transceiver chain fulfills a predetermined criterion, to stop communication of signals within the first frequency range, and to communicate signals within the third frequency range;
    wherein the predetermined criterion is the second transceiver chain providing at least one of valid I/O data from the reception of signals or data whose error rate is below a predetermined threshold from the reception of signals within the first frequency range.

2. The communication device according to claim 1, wherein the resetting of carrier aggregation is a resetting to a setting in which the second transceiver chain is prevented from communicating signals in the third frequency range.

3. The communication device according to claim 1, wherein the controller is configured to control the first transceiver chain to stop communication of signals within the first frequency range and to cause the first transceiver chain to begin communication of signals in a third frequency range.

4. The communication device according to claim 1, wherein the third frequency range comprises the first frequency range.

5. The communication device according to claim 1, wherein the first frequency range corresponds to a component carrier and the third frequency range corresponds to a plurality of component carriers including the component carrier.

6. The communication device according to claim 1, wherein the third frequency range comprises the first frequency range and wherein the resetting comprises a setting of the second transceiver chain to communicate signals within the third frequency range and the controller is configured to control the first transceiver chain, when the communication of signals within the first frequency range by the second transceiver chain fulfills a predetermined criterion, to stop communication of signals within the first frequency range.

7. The communication device according to claim 1, wherein the first frequency range, the second frequency range and the third frequency range each correspond to one or more component carriers.

8. The communication device according to claim 1, wherein the instruction for a resetting of carrier aggregation is an instruction for an activation of a communication of the third frequency range.

9. The communication device according to claim 1, wherein the instruction is a Medium Access Control Control Element.

10. The communication device according to claim 1, further comprising a baseband circuit wherein each transceiver chain is configured to at least one of provide data to the baseband circuit from the communication of signals in a frequency range and to receive data from the baseband circuit for the communication of signals in the frequency range.

11. The communication device according to claim 1, wherein the first frequency range is a frequency range of a primary radio cell of the communication device and the second frequency range is a frequency range of a secondary radio cell of the communication device.

12. The communication device according to claim 1, wherein the first transceiver chain and the second transceiver chain are integrated into a single chip.

13. The communication device according to claim 1, wherein the third frequency range is a frequency range for performing radio measurements.

14. A method for controlling transceiver chains of a communication device comprising:
    setting a first transceiver chain to communicate signals in a first frequency range;
    setting a second transceiver chain to communicate signals in a second frequency range distinct from the first frequency range or to no communication;
    receiving an instruction for a resetting of carrier aggregation comprising a setting of the first transceiver chain or the second transceiver chain to communicate signals in a third frequency range different from the first frequency range and the second frequency range;
    controlling, in response of the reception of the instruction, the second transceiver chain to communicate signals within the first frequency range while the first transceiver chain simultaneously communicates signals within the first frequency range;
    controlling the first transceiver chain, when the communication of signals within the first frequency range by the second transceiver chain fulfills a predetermined criterion, to stop communication of signals within the first frequency range and to start communication of signals within a third frequency range;
    wherein the predetermined criterion is the second transceiver chain providing at least one of valid I/O data from the reception of signals or data whose error rate is below a predetermined threshold from the reception of signals within the first frequency range.

15. The method according to claim 14, wherein the resetting comprises a setting of the first transceiver chain to communicate signals within the third frequency range and the method further comprises controlling the first transceiver chain, when the communication of signals within the first frequency range by the second transceiver chain fulfills a predetermined criterion, to communicate signals within the third frequency range.

16. The method according to claim 15, wherein the resetting of carrier aggregation is a resetting to a setting in which the second transceiver chain is prevented from communicating signals in the third frequency range.

17. A non-transient computer readable medium having recorded instructions thereon which, when executed by a processor, make the processor perform a method for performing radio communication according to claim 14.

18. A communication device comprising:
- a first transceiver chain set to communicate signals in a first frequency range;
- a second transceiver chain set to communicate signals in a second frequency range distinct from the first frequency range, or set to no communication; and
- a controller, configured
    - to receive an instruction for a resetting of carrier aggregation comprising a setting of the first transceiver chain or the second transceiver chain to communicate signals in a third frequency range different from the first frequency range and the second frequency range;
    - to control, in response to the reception of the instruction, the second transceiver chain to communicate signals within the first frequency range while the first transceiver chain simultaneously communicates signals within the first frequency range;
    - to control the first transceiver chain, when the communication of signals within the first frequency range by the second transceiver chain fulfills a predetermined criterion, to stop communication of signals within the first frequency range, and to communicate signals within the third frequency range;
- wherein the third frequency range comprises the first frequency range and wherein the resetting comprises a setting of the second transceiver chain to communicate signals within the third frequency range and the controller is configured to control the first transceiver chain, when the communication of signals within the first frequency range by the second transceiver chain fulfills a predetermined criterion, to stop communication of signals within the first frequency range.

* * * * *

UNITED STATES PATENT AND TRADEMARK OFFICE
CERTIFICATE OF CORRECTION

PATENT NO. : 9,848,425 B2
APPLICATION NO. : 14/525246
DATED : December 19, 2017
INVENTOR(S) : Sabine Roessel et al.

It is certified that error appears in the above-identified patent and that said Letters Patent is hereby corrected as shown below:

In the Claims

Column 13, Line 30: Please delete "I/O" between the words "valid" and "data", and write "I/Q" in place thereof.

Column 14, Line 50: Please delete "I/O" between the words "valid" and "data", and write "I/Q" in place thereof.

Signed and Sealed this
Twelfth Day of June, 2018

Andrei Iancu
*Director of the United States Patent and Trademark Office*